US005425326A

United States Patent [19]

Tibbedeaux

[11] Patent Number: 5,425,326

[45] Date of Patent: Jun. 20, 1995

[54] STOWABLE BOAT TRAILER

[76] Inventor: Donald L. Tibbedeaux, 4223 Spring Way Cir., Valrico, Fla. 33584

[21] Appl. No.: 137,936

[22] Filed: Oct. 19, 1993

[51] Int. Cl.[6] .......... B60P 3/10

[52] U.S. Cl. .......... 114/344

[58] Field of Search .......... 114/343, 344; 280/414.1–414.3

[56] References Cited

U.S. PATENT DOCUMENTS

| | | | |
|---|---|---|---|
| 2,909,378 | 10/1959 | Borchers, Jr. | 280/414.2 |
| 3,036,841 | 5/1962 | Dunn | 280/414.2 |
| 3,831,211 | 8/1974 | Bustamante | 114/344 |
| 5,042,417 | 8/1991 | Raymond | 114/344 |

*Primary Examiner*—Edwin L. Swinehart

[57] ABSTRACT

A stowable boat trailer is disclosed comprising a mounting plate to be attached onto the transom of a small boat, and the plate has two receptacles to accommodate two separate rods, inserted from each side of the trailer, and each of the rods being bent downward, and attached to a wheel. The two receptacles on the main mounting plate have a separation between them to accommodate an outboard motor. An eye bolt arrangement is attached onto the bow of the boat, for attaching to a trailer hitch of a towing vehicle. The wheel assemblies of the trailer are detachable from the boat for storage inside the boat, for portage, or other purposes.

2 Claims, 4 Drawing Sheets

STOWABLE BOAT TRAILER

BACKGROUND OF INVENTION

This invention relates to an apparatus and method of trailering a small boat in camping areas sometimes on the public highways. It provides a method for easily transporting the boat between a campsite and a launching area, as well as for portaging the boat in areas where it must be removed from the water and hauled to another launching site to continue the trip, without carrying the boat. This apparatus also is stowable in the boat, in order that it is always available for use, even when the boat is not near the original launching site.

It has bead customary for small boats to be transported to and from their launching sites by one of two methods. One method is to use a standard boat trailer, which is hitched to the rear of a car., or other vehicle, and is backed into the water for loading and unloading of the boat. A boat trailer of this type is expensive, and heavy, and not stowable, and can be efficiently used only when a vehicle is available to maneuver it into the necessary positions for launching the boat, or removing it from the water. A trailer of this type is not adaptable to transporting simple, small boats and canoes, and as it would not be needed when the boat is launched, which would be a storage problem for the user.

Another method is to transport the boat on top of a vehicle, then manually remove it and carry it to the water. This method requires some physical strength on the part of the persons handling the boat, and can expose them to the danger of injury, should the boat slip while they are moving it, or be too heavy for them to safely lift and carry the required distance. Also, when launching the boat with a normal trailer, it is normally necessary to wade into the water to launch the boat, and retrieve the trailer. Portaging is also a slow and laborious undertaking, in that the boat and all of its contents must be hauled over land, with nothing except the users physical strength to carry the load from the debarcation site to the new embarcation site.

Several attempts have been made to improve on the traditional methods of trailering small boats. One approach, taught by Kock in U.S. Pat. No. 5,154,564, modifies the winch mechanism used on boat trailers to load and unload the boat. This mechanism uses a pulley to change the direction of the force exerted on the boat by the winch cable, in order that when the trailer is backed into the water and the winch mechanism is activated, a rearward thrust is developed, and the boat moves more readily off the trailer and into the water. This method does not offer any benefits in the task of reloading the boat onto the trailer, and still requires the use of a heavy trailer pulled by a vehicle. It also offers no advantage when portaging is required, since the trailer remains with the vehicle at the original launching site, while the boat is used to travel elsewhere.

Another approach is taught in the art of Grinde, in U.S. Pat. No. 4,947,779, whereby a tow bar is used when a small boat is connected to the stern of a larger boat for towing. This apparatus uses a flexible bar, which can be coupled to the bow of the towed boat, and which also connects to the transom, or swim platform of the towing craft. This apparatus is not useful for launching a boat, or removing it from the water, and does not provide any help when portaging is required.

Still another approach is taught in the art of wild, in U.S. Pat. No. 3,453,002, whereby a two wheeled transporting device is disclosed, which allows one person to move a small sailboat from one location to another. It incorporates a cradle designed to hold a sailboat having a specific shape, at some point slightly forward of the stern. This provides proper balancing so that one person can maneuver the boat, while avoiding interference with the craft's rudder. This apparatus can be used to launch, or beach a sailboat without scraping it against rocks, or other harmful objects, but this advantage does not extend to portaging, since the apparatus is useful only at the original launching site. It is also limited to boats having a specific shape, so that several versions would be needed to transport boats of different cross sectional shapes, and, it is not stowable.

SUMMARY OF THE INVENTION

Accordingly, it is an object of this invention to provide an apparatus and method for trailering a small boat, which can be used to easily transport the boat to and from the launching site, without requiring heavy lifting on the part of the boats users, and then, after launching the boat, the trailer can be stowed inside the boat itself.

Another object of this invention is to provide an apparatus and method for trailering a small boat, which can be used with a variety of different boats, including row boats, small fishing boats, and other pleasure craft, without requiring a completely new trailer for each type of boat.

Another object of this invention is to provide a method and apparatus for trailering a small boat, which can be easily modified for use with canoes, or other small boats that do not have a transom design of the type found in row boats.

Still another object of this invention is to provide a method and apparatus for trailering a small boat, which apparatus can be stowed inside the craft and used whenever portaging is necessary, so that the craft and its contents can be quickly and easily transported over land, from the debarcation site to the new embarcation site.

In carrying out this invention in the illustrative embodiment thereof, a stowable traileriing apparatus is provided, consisting of a main mounting plate, which is permanently affixed to the rear of the transom of the boat. This plate incorporates two substantially square receptacles, of a length to engage the mating mounting hardware of a pair of wheels, and the mounting hardware having affixing holes to match two holes in the receptacles of the mounting plate. The mounting hardware for each wheel has a fork type bottom portion to accommodate a wheel, a vertical potation with a length to hold the boat well above the ground, and the vertical portion having a more or less 90 degree bend at its upper end, and the 90 degree bend being of a length to be inserted into the square receptacle of the mounting plate, and be removeably inserted into the receptacle, and extending outwardly beyond the sides of the boat, providing a width for the apparatus to clear the sides of the boat.

With this main mounting plate mounted onto the transom of the boat, the front of the boat can be either attached to the rear of a car, truck, or other towing vehicle, or, can be lifted by the user, and transported as desired. Upon reaching a destination, the apparatus can be easily removed from the transom of the boat, and stowed inside the boat, or, completely removed from the boat for storage elsewhere. The mounting plate remains on the transom of the boat. Also, when trailering behind a vehicle, an eye bolt is installed through the bow of the boat, and the eye bolt mates with the towing device on the rear of the towing vehicle.

In a second embodiment of the invention, for use on a canoe type boat, the mounting plate is mounted onto the upper rear end of the boat, and is contoured to fit the surface of the boat, and the horizontal portion of the wheel mounting apparatus extends completely through the square receptacles, and is secured at the outer end of the horizontal portion of the apparatus.

Conveniently, the user may install the mounting plate onto the transom of the boat, or, on the top of the canoe, insert the wheel mounting apparatus into the receptacles, and transport the boat, or canoe as desired, not having to lift the entire weight of the boat, or canoe, and its contents.

When trailering behind a vehicle, a towing device is installed onto the front of the boat, consisting of an eye bolt extending through the front of the boat, and the eye bolt mating with the towing apparatus on the rear of the vehicle.

BRIEF DESCRIPTION OF THE DRAWINGS

This invention, together with other objects, features, aspects and advantages thereof, will be more clearly understood from the following description, considered in conjunction with the accompanying drawings.

Four sheets of drawings are furnished, sheet one contains FIG. 1, Sheet 2 contains FIG. 2, and FIG. 3, sheet 3 contains FIGS. 4, and 5, and sheet four contains FIG. 6.

DESCRIPTION OF THE PREFERRED EMBODIMENTS

Figure 1:
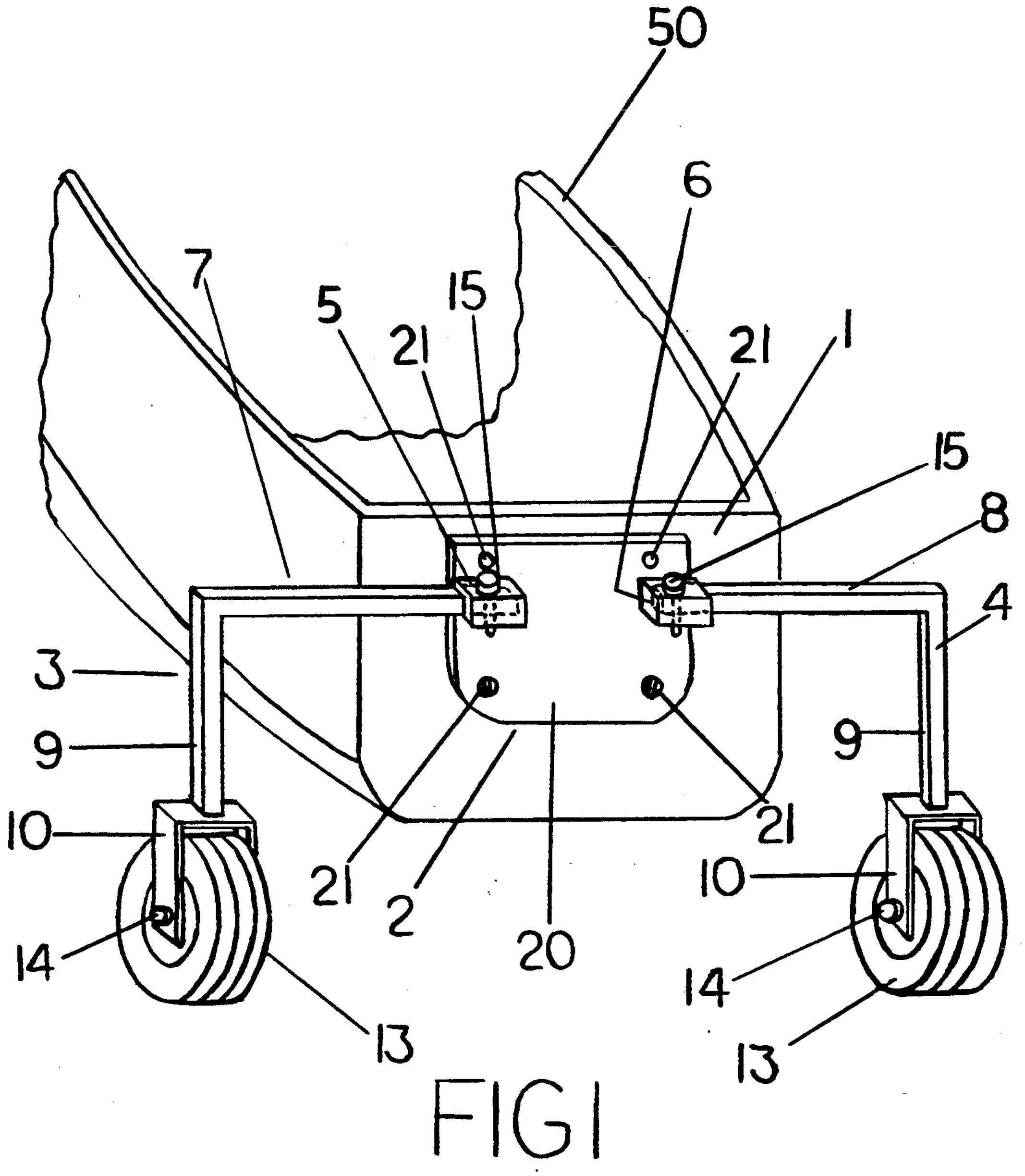
FIG. 1 is an isometric representation of the stern mounted components of the stowable boat trailering apparatus, including the transom plate assembly and the removable wheel assemblies.
Figure 5:
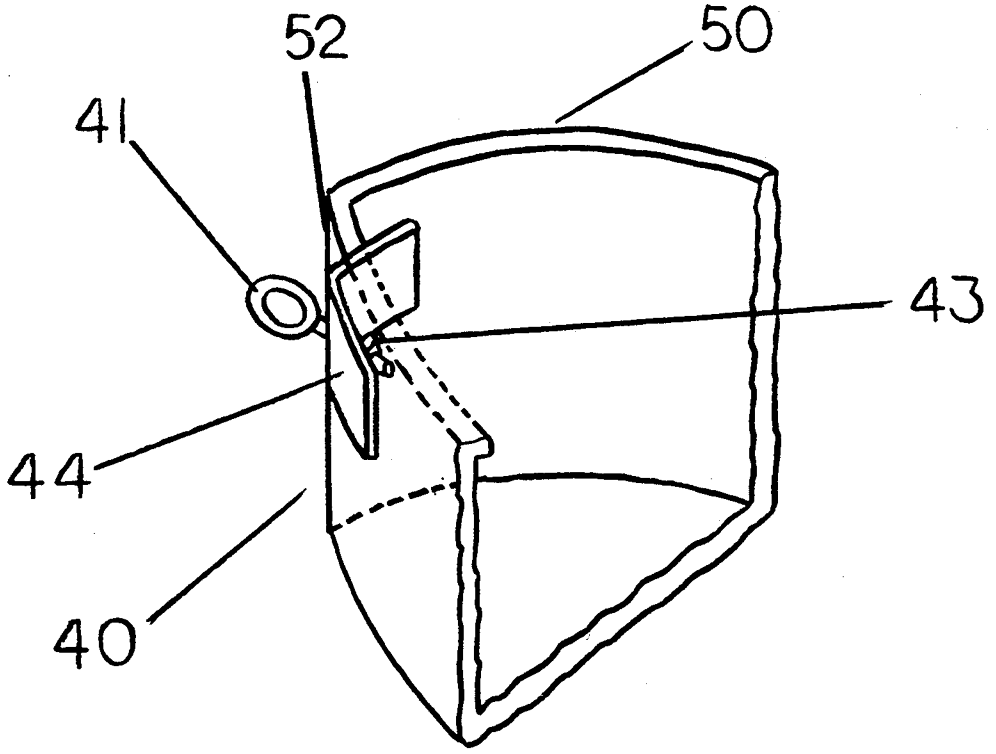
FIG. 5 is an isometric view of the bow of a small boat, showing the mounting of the eye bolt apparatus.
Figure 6:
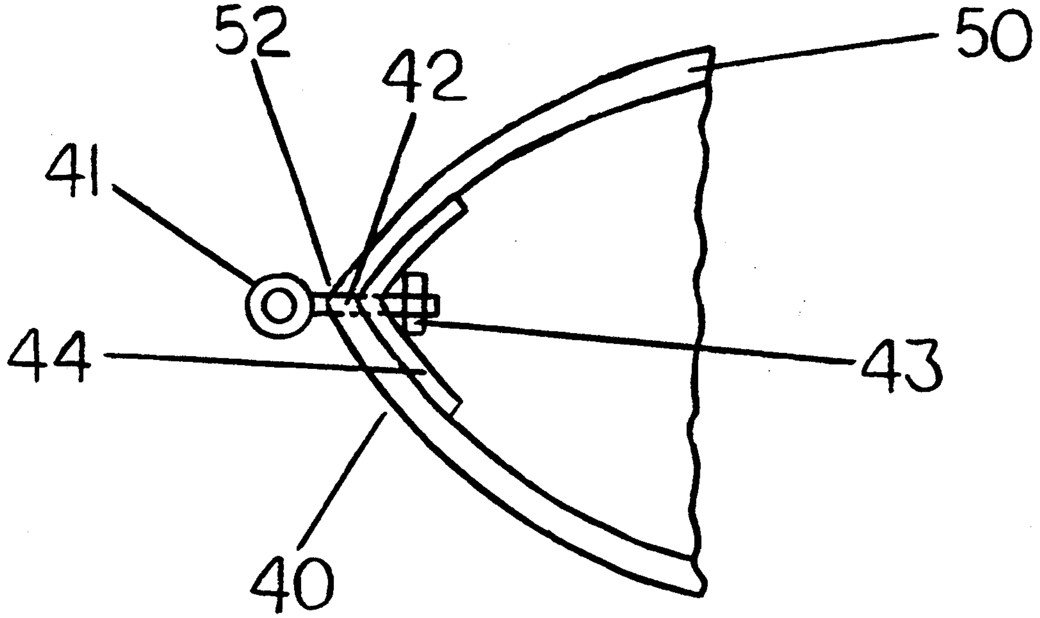
FIG. 6 is a plan view of the bow of a small boat, showing a top view of the eye bolt handling apparatus.

Referring now to FIG. 1, a stowable boat trailering apparatus, referred to generally by the reference numeral 1 is made of a suitable material, and comprises a transom plate assembly 2, two detachable wheel assemblies 3, and 4, and an eye bolt handling apparatus 40, more easily seen in FIGS. 5, and 6.

Now, transom plate assembly 2 consists of a base plate 20, having two channels 5, and 6 affixed to its outer surface. Base plate 20 is permanently affixed in a generally vertical plane to transom 51 of small boat 50 by means of screws 21, which are installed through mounting holes 22, more easily seen in FIG. 2.

Now, and still referring to FIG. 1, wheel assemblies 3, and 4 have generally horizontal sections 7 and 8, the free ends of which are designed to mate with channels 5, and 6 of transom plate assembly 2. Affixed to the opposite ends of horizontal sections 7, and 8, are generally vertical sections 9, which terminate in forks 10. Forks 10 have holes 11 bored through their lateral surfaces, more easily seen in FIG. 4, through which are inserted axles 12, which support wheels 13. Axles 12 are secured by hub caps 14 at both ends of axle 12.

Figure 2:
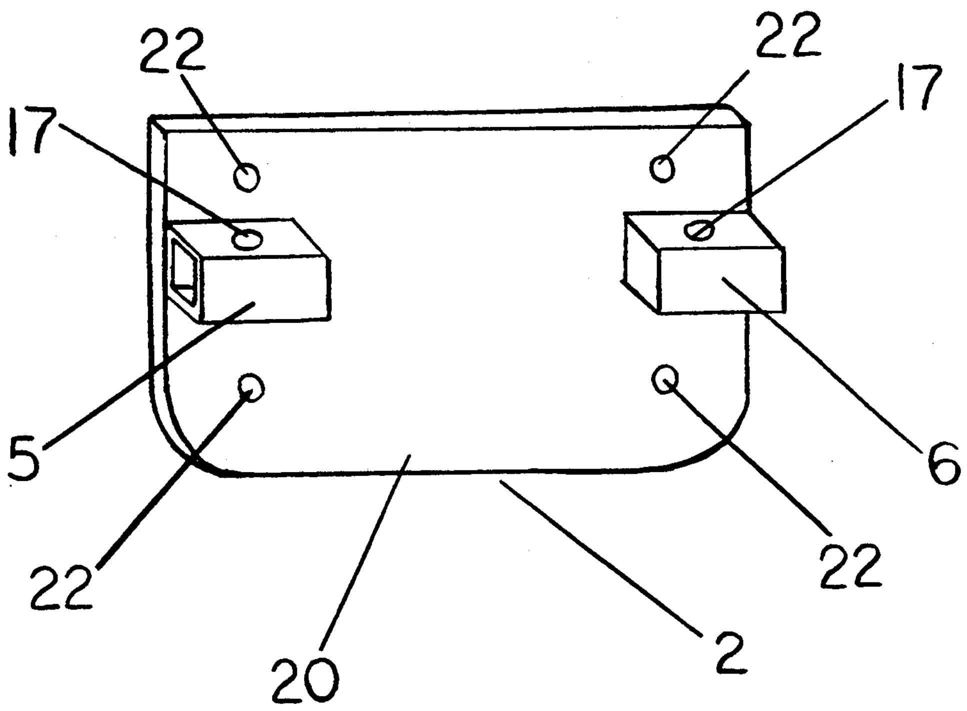
FIG. 2 is an isometric view of the transom plate assembly, showing the receptacles which accept the wheel assemblies.

Now, and referring to FIG. 2, we see holes 17 bored through channels 5, and 6. Horizontal sections 7, and 8 of wheel assemblies 3, and 4 have matching holes 16 bored through their upper and lower surfaces, to accept anchor pins 15, anchor pins 15 inserted through holes 16, and 17, thus securing wheel assemblies 3, and 4 to transom plate assembly 2, while trailering apparatus 1 is being used.

Still referring to FIG. 2, we see a view of transom plate assembly 2 showing the locations of channels 5, and 6, wheel assembly mounting holes 17, and base mounting plate mounting holes 22.

Figure 3:
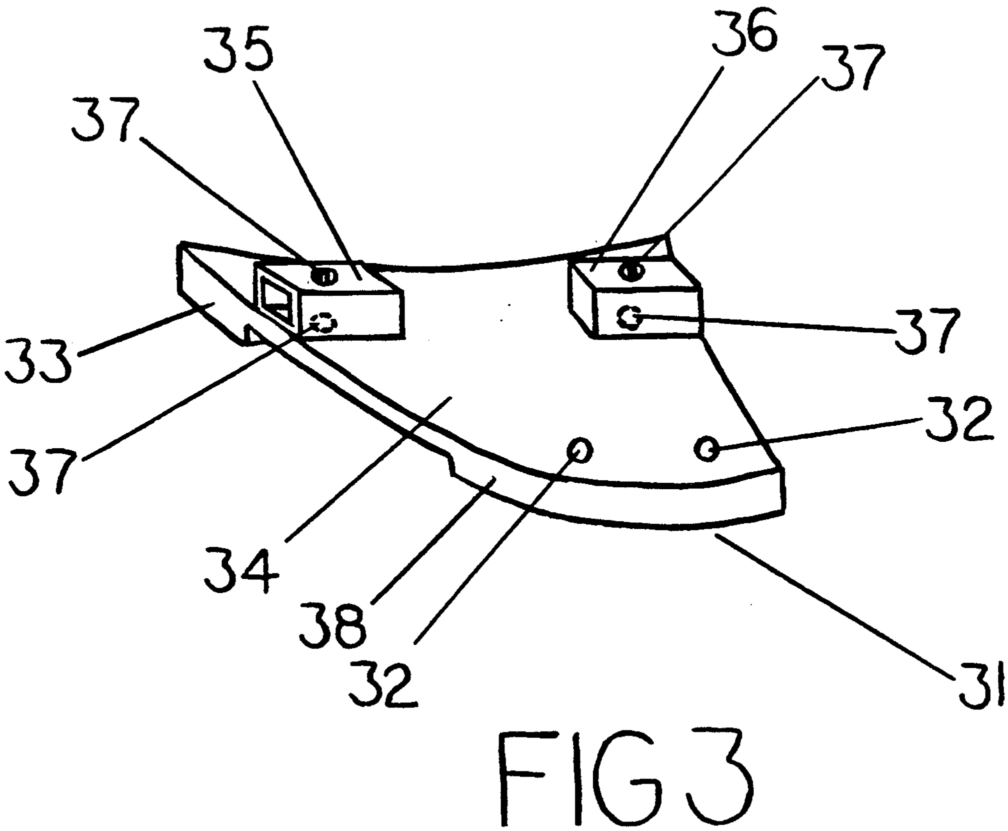
FIG. 3 is an isometric view of an alternate embodiment for mounting onto a canoe.

Progressing now to FIG. 3 we see an alternate transom plate assembly 31, for use on canoes, or other boats that require the transom plate to be installed horizontally on the top of the boat. Transom plate assembly 31 incorporates a curved base plate 34, in order that it may be installed easily on a canoe. Base plate 34 has channels 35, and 36 affixed onto its upper surface, channels 35, and 36 accepting horizontal sections 7, and 8 of wheel assemblies 3, and 4. Holes 37 are bored horizontally through the upper surfaces of channels 35, and 36, and also through base plate 34, in order that anchor pins 15, shown in FIG. 1, may be inserted through holes 16, and 37, to secure wheel assemblies 3, and 4 to transom plate assembly 31. (in this embodiment, and in some cases, holes 37 may be eliminated as desired). Mounting holes 32 are provided, to allow transom plate assembly 31 to be installed on the rear deck of the canoe. Also, base plate 34 can be made with thicker end sections 33, and 38, in order that anchor pins 15 may be inserted completely through base plate 34, without encountering interference from the deck of the canoe.

Figure 4:
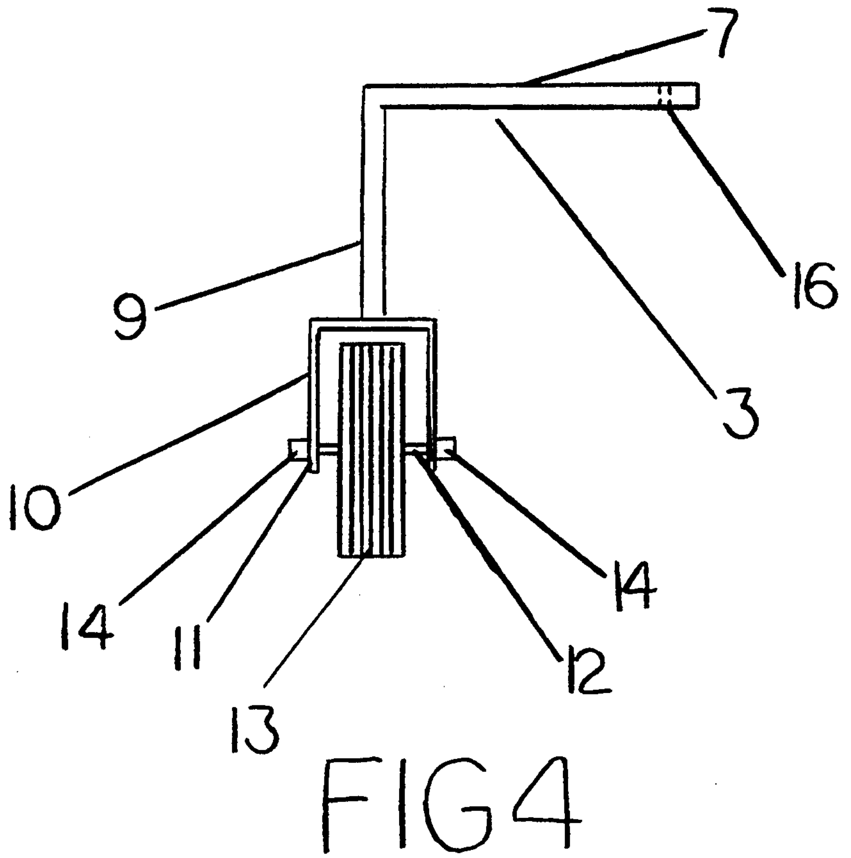
FIG. 4 is an elevation view of the wheel mounting assembly, shown its components in greater detail.

Moving now to FIG. 4, we see an elevation of wheel assembly 3, which show horizontal section 7 having holes 16 near the free end to allow secure connection of wheel assembly 3 to transom plate assembly 2, or 31. Vertical section 9 is connected to the opposite end of horizontal section 7, and vertical section 9 has fork 10 at its lower portion. Fork 10 has holes 11 bored horizontally through its lateral surfaces, allowing the installation of axle 12, and wheel 13, axle 12 being secured by hub caps 14 at each outer end.

Moving now to FIG. 5, we see the bow 52 of boat 50, which has eye bolt handling apparatus 40 attached, which serves as a trailer hitch when boat 50 is pulled by a towing vehicle, or as a handle when boat 50 is manually maneuvered by a person.

Now, handling apparatus 40 consists of eye bolt 41, which is installed through hole 42, more easily seen in FIG. 6, which is bored into bow 52. Eye bolt 41 is secured in position by nut 43, and reinforcing plate 44, which is installed between bow 52, and nut 43.

FIG. 6 provides an additional top view of handling apparatus 40, showing eye bolt 41, bow 52, reinforcing plate 44, and nut 43 in their relative positions.

Accordingly a very unique, useful, and convenient method, and apparatus are provide for trailering a boat in off road applications, consisting of a permanently mounted transom plate assembly, and removable wheel assemblies at the stern of the boat, and a handling apparatus at the bow of the boat, and the wheel assembly being removable, and stowable, and a handling apparatus at the bow of the boat. This apparatus provides a convenient method of launching or beaching the boat, and, because it is stowable inside the boat itself, a convenient method of portaging the boat when necessary, during the course of a boat trip.

Since minor changes and modifications varied to fit particular operating requirements and environments will be understood by those skilled in the art, the invention is not considered limited to the specific examples chosen for purposes of illustration, and includes all changes and modifications which do not constitute a departure from the true spirit and scope of this invention as claimed in the following claims and reasonable equivalents to the claimed elements,

What is claimed is:

1. A stowable boat trailer, for attaching to a small boat, for easy trailering purposes, comprising:

a flat mounting plate, made of a suitable material and of a suitable size and thickness, said mounting plate having an inner surface and an outer surface, said mounting plate having attachment means for attachment to the transom of a boat, and said mounting plate having two substantially square receptacles affixed onto its outer surface, along a horizontal axis, said receptacles being separated a distance from each other to allow for the mounting of an outboard motor on the transom between the receptacles, two formed square supporting rods, said rods having a vertical portion, and a horizontal portion, said rods having a fork arrangement attached at the extreme lower end of said vertical portion, said fork arrangement having affixing means for an axle and a wheel, said horizontal portion of said two rods each having mating means to be inserted into said square receptacles, and to be affixed therein by retaining hardware, an eye bolt, mating nut, and backing plate, said eye bolt adapted to protrude through the bow of the boat, and can be retained therein by said nut, and backing plate, said eye bolt providing attaching means for a trailer hitch of a towing vehicle.

2. A stowable boat trailer, for attaching to a canoe, for easy trailering purposes, comprising:

a flat mounting plate, made of a suitable material and of a suitable size and thickness, said mounting plate having an inner surface and an outer surface, said mounting plate having attachment means for attachment to a rear deck of the canoe, and said mounting plate having two substantially square receptacles affixed onto its outer surface, along a horizontal axis, said receptacles being separated a distance from each other, two formed square supporting rods, said rods having a vertical portion, and a horizontal portion, said rods having a fork arrangement attached at the extreme lower end of said vertical portion, said fork arrangement having affixing means for an axle and a wheel, said horizontal portion of said two rods each having mating means to be inserted into said square receptacles, and to be affixed therein by retaining hardware, an eye bolt, mating nut, and backing plate, said eye bolt adapted to protrude through the bow of the canoe, and can be retained therein by said nut, and backing plate, said eye bolt providing attaching means for a trailer hitch of a towing vehicle.

* * * * *